INVENTOR.
Martin Loomis
BY
Barnard, McGlynn & Reising
ATTORNEYS

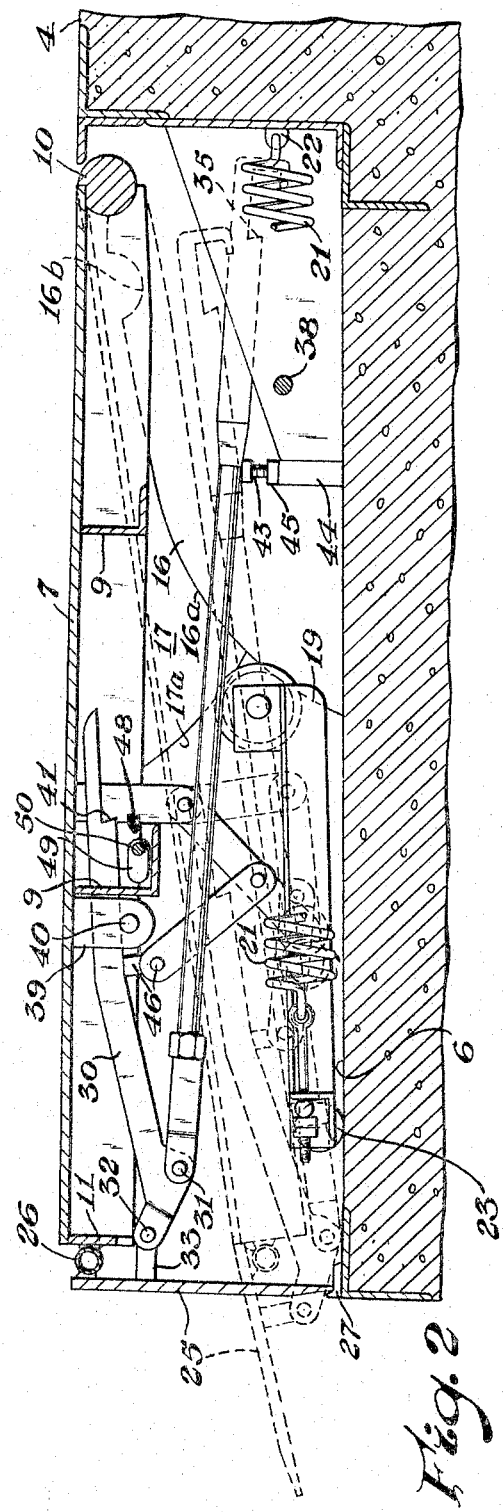
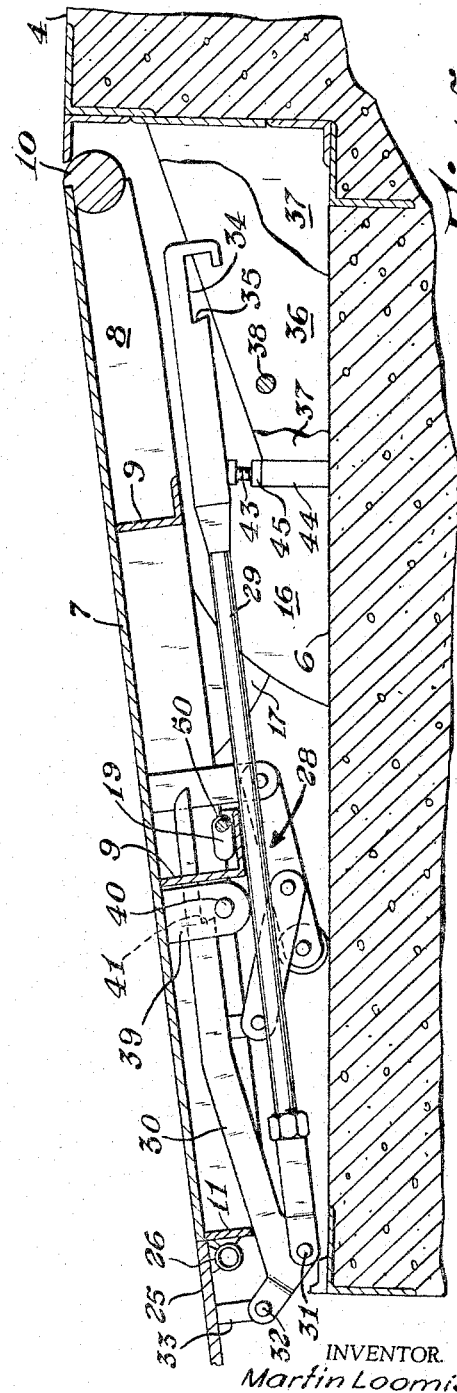

June 6, 1967 M. LOOMIS 3,323,158
LOADING RAMP CONSTRUCTION
Original Filed June 20, 1962 4 Sheets-Sheet 3

INVENTOR.
Martin Loomis
BY
Barnard, McIlynn & Leising
ATTORNEYS

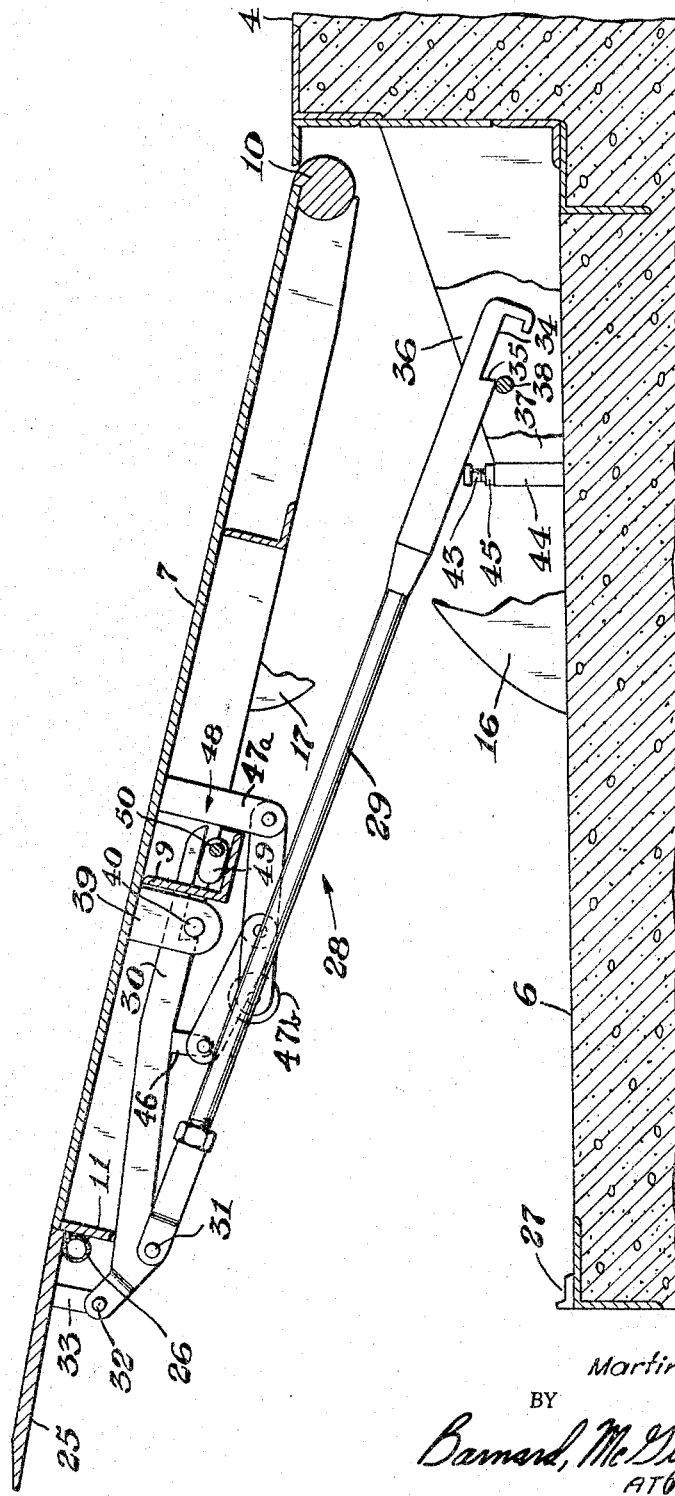

United States Patent Office 3,323,158
Patented June 6, 1967

3,323,158
LOADING RAMP CONSTRUCTION
Martin Loomis, Clare, Mich., assignor, by mesne assignments, to Martin Loomis & Clyde D. Loomis, Clare, Mich.
Continuation of application Ser. No. 203,924, June 20, 1962. This application Oct. 22, 1965, Ser. No. 501,609
35 Claims. (Cl. 14—71)

This invention relates to a loading ramp construction of the kind adapted to form an adjustable bridge between a loading dock and a truck or other carrier to be loaded or unloaded at the dock, and is a continuation of Ser. No. 203,924, filed June 20, 1962, in the name of Martin Loomis, and now abandoned. More particularly, the invention relates to a loading ramp having an extensible and retractable lip or forward edge which is capable of being projected forwardly of the dock or tucked in a folded position so as not to project beyond the dock.

An object of the invention is to provide an adjustable loading ramp having an extensible and retractable lip portion and in which the lip portion is extended and retracted in response to adjustment of the loading ramp.

Another object of the invention is to provide an adjustable loading ramp of the kind described in which the adjustments of the lip portion are effected by purely mechanical means.

A further object of the invention is to provide positively operating latch means for locking the lip portion of the ramp in its projected position.

Another object of the invention is to provide an extensible and retractable lip section for a loading ramp which may be extended and retracted without requiring movement of a vehicle away from the loading dock.

A further object of the invention is to provide both manually and automatically operable latch releasing mechanisms for enabling the lip portion of the ramp to be unlocked or released, as desired.

Another object of the invention is to provide an adjustable loading ramp construction of the character referred to wherein the lip member is capable of supporting the ramp in a substantially horizontal, dock level position.

Other objects and advantages of the invention will be pointed out specifically or will become apparent from the following description when it is considered in conjunction with the appended claims and the accompanying drawings, in which:

FIGURE 2 is a longitudinal, sectional view illustrating in full lines the loading ramp in its inactive, dock level position;

FIGURE 4 is a view similar to FIGURE 3 but illustrating the ramp in an intermediate position between the positions shown in FIGURES 2 and 3, and further illustrating the lip member in its projected position;

FIGURE 5 is a view similar to FIGURE 2 but illustrating the loading ramp in a lowered position and with the lip member unlatched.

Figure 1:
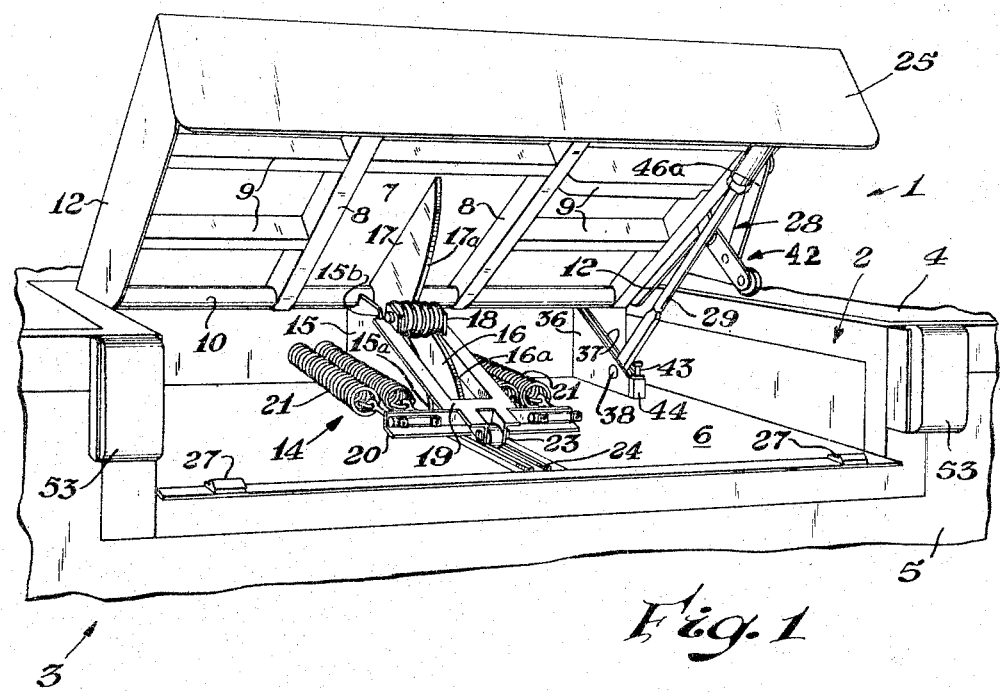
FIGURE 1 is a fragmentary, perspective view illustrating a loading ramp constructed in accordance with the invention and installed on a loading dock, the ramp being shown in an elevated or raised position.
Figure 6:
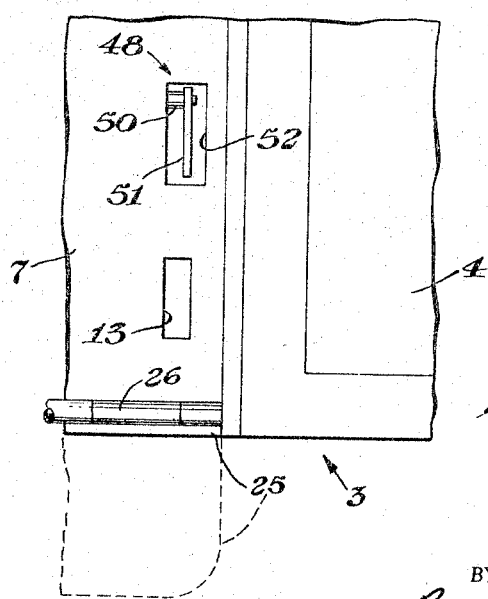
FIGURE 6 is a fragmentary, top plan view of the loading ramp and dock and illustrating a portion of the manually operable latch releasing mechanism.

A loading ramp constructed in accordance with the invention is represented generally by the reference character 1 and is disclosed as being mounted in a recess 2 formed in a dock 3 having a flat, generally horizontal upper surface 4 terminating in a vertical front wall 5. The recess 2 has a generally flat base or supporting surface 6 that is downwardly spaced from the surface 4. Instead of being supported on the dock, the loading ramp could be provided with an independent supporting frame so as to permit it to be mounted adjacent and forwardly of the front wall 5, as is conventional in the art.

The loading ramp comprises a platform or ramp member 7 to the underside of which are secured longitudinal and transverse reinforcing members 8 and 9, respectively. At the rearward end of the ramp member is fixed a cylindrical shaft 10, the ends of which extend beyond the side edges of the ramp and are rockably journaled in bearings supported by the dock 3. The forward end of the ramp is provided with a depending plate 11, and the sides of the ramp are provided with downwardly extending, inwardly inclined guard plates 12. The plates 12 prevent a workman's foot from being trapped between the ramp 7 and the sides of the recess 2.

The ramp member 7 preferably is swingable manually about the axis of the shaft 10 from a lowered position to a raised position, and return. To facilitate upward swinging of the ramp, the latter is provided with openings 13 adjacent its forward end. The openings 13 are of sufficient size to accommodate a workman's hand, but do not interfere with the travel of hand or power operated trucks over the ramp.

Lift means 14 is provided to assist a workman in raising and lowering the ramp member. The lift means is similar to the corresponding apparatus disclosed in co-pending application Ser. No. 93,145, filed Mar. 3, 1961, and need not be described in detail. Briefly, however, the lift means comprises a pair of cams 15 and 16 mounted on the base of the recess 2 and adjacent the rear wall thereof. The cams 15 and 16 have parallel surfaces 15a and 16a which rise in a rearward direction and merge into recessed dwell portions 15b and 16b. Between the cams 15 and 16 is a cam 17 that is welded to the lower surface of the ramp 7 and has a cam surface 17a which rises toward the rear end of the ramp. Between the cams 15, 16 and 17 is a plurality of rollers 18 which are journaled on a common shaft that is supported by a frame 19. At the forward end of the frame 19 is welded a cross bar 20, to which are anchored corresponding ends of a plurality of springs 21. The opposite ends of the springs are anchored to brackets 22 (FIGURE 2) that are fixed at the rear wall of the recess 2.

The arrangement is such that the springs 21 constantly exert a force on the frame 19 tending to move the latter rearwardly of the ramp member, thereby causing the rollers 18 to exert a lifting force on the cam 17 tending to raise the ramp. The frame 20 is guided in its movements by a roller 23 that is received between the sides of a track 24 which is secured to the floor 6 of the recess. The net force exerted by the springs on the ramp is less than the amount required to counterbalance completely the weight of the ramp when the latter is in its horizontal, dock level position. Thus, the ramp is urged by gravity to rock downwardly.

At the forward end of the ramp member 7 is a lip member 25 which is hingedly connected to the ramp plate 11 by means of a piano-type hinge 26. The lip is capable of swinging movement from a depending, retracted position, such as is shown in full lines in FIGURE 2, to a raised projected position in substantial prolongation of the ramp member 7, as is shown in dotted lines in FIGURE 2 and in FIGURE 4. The length of the lip 25, in a fore and after direction, is such that, when its free end is supported on the base of the recess, the ramp member 7 will be located in a generally horizontal, dock level position.

In its depending or retracted position the lip 25 may form the sole support for the forward end of the ramp member 7. To guard against any possibility of inadvertent swinging of the lip in a clockwise direction, as viewed in FIGURE 2, the base 6 of the dock recess may be provided with keepers 27 adjacent the front wall 5 and behind which the free end of the lip is received.

An operating linkage designated generally by the reference character 28 is provided to effect automatic extension of the lip member 25 in response to swinging movement of the ramp member from an elevated to a lowered position. The linkage 28 comprises an operating link 29 which is pivoted at its forward end to a lever 30 by means of a pin 31. The forward end of the lever 30 is pivoted as at 32 to an arm 33 that is fixed to the lower surface of the lip 25.

The rearward end of the operating link 29 is free and is provided with a notch 34 that terminates in an abrupt, forward wall 35. The free end of the link 29 is received between a pair of parallel guide plates 36 and 37. Supported by the guide plates 36 and 37 and spanning the distance therebetween is a pin 38 that is adapted to be received in the notch 34 formed in the link 29. The notch 34 and the pin 38 constitute actuating means for effecting operation of the linkage 28 in a manner presently to be explained.

The lever 30 extends rearwardly from its pivotal connection 31 and is slidably received between a pair of spaced apart, parallel lugs 39 that are fixed on the ramp 7. A pin 40 spans the distance between the lugs 39 and slidably supports the lever 30. The rear end of the lever 30 is cut away to provide an abrupt wall 41 that is adapted to engage the pin 40. The parts 40 and 41 constitute latch means for releasably latching the lip member 25 in its projected position.

In the operation of the apparatus thus far described, the ramp member 7 may be swung upwardly from the position shown in full lines in FIGURE 2 to the position shown in FIGURE 1. As the ramp is swung upwardly, the operating link 29 moves with the ramp. Since the notched end of the link 29 is free, it is maintained between the guide plates 36 and 37 by gravity so that the notch 34 moves closer to the actuating pin 38 as the ramp is swung upwardly. Eventually, upward swinging of the ramp will cause the link 29 to be moved an amount such as to permit the actuating pin 38 to be received in the notch 34. This is the position of the parts shown in FIGURES 1 and 3.

When the pin 38 is positioned in the notch 34, downward swinging movement of the ramp from the position shown in FIGURE 7 will cause the notch wall 35 to bear forcibly against the pin 38 so as to prevent rearward movement of the link 29. Thus, continued downward movement of the ramp 7 will cause the link 29 to rock about the arc of a circle having its center at the pin 38.

Figure 3:
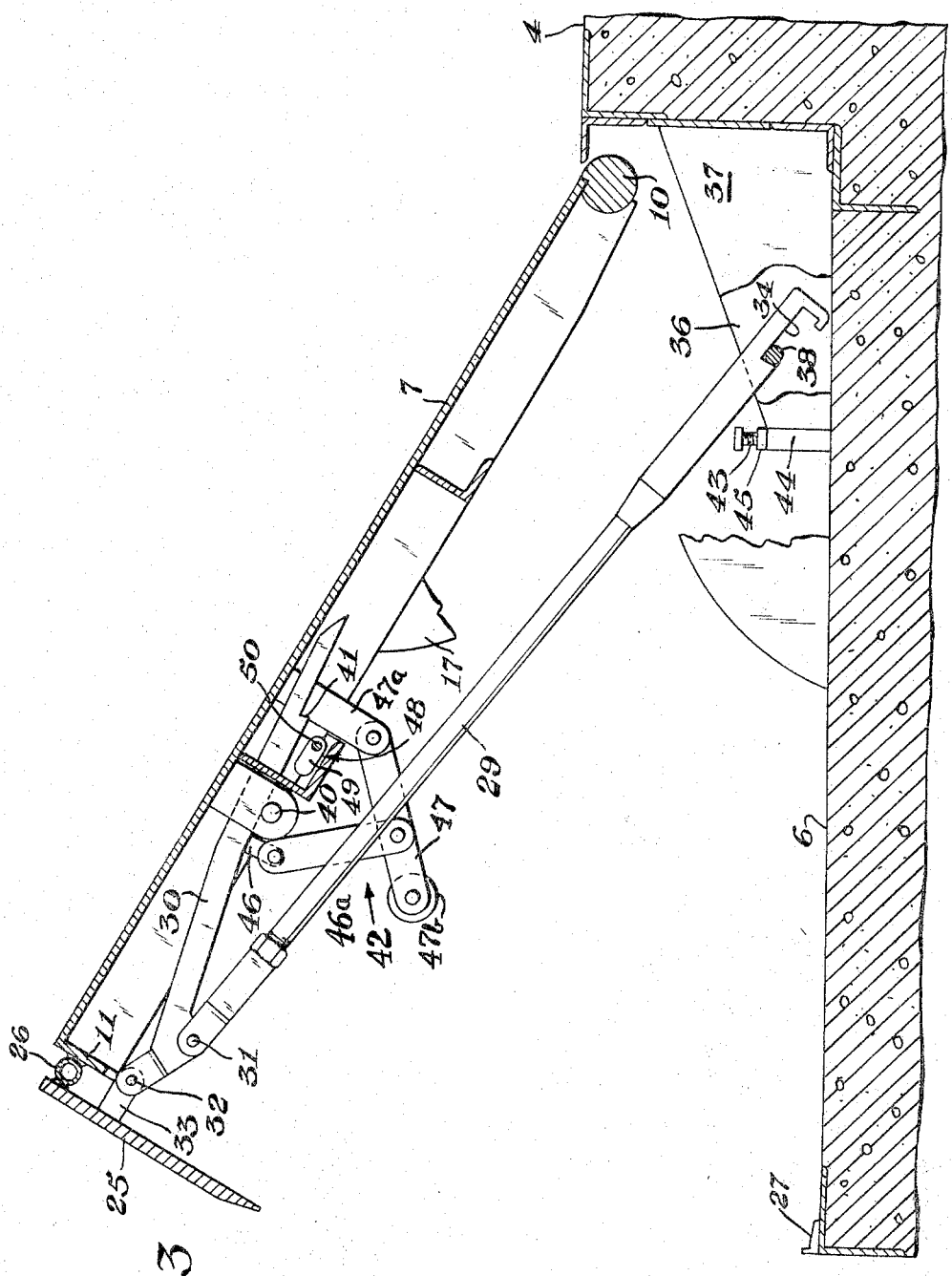
FIGURE 3 is a fragmentary, sectional view similar to FIGURE 2 but illustrating the loading ramp in its elevated position, the counterbalancing and lift mechanism being partially omitted for clarity.

Inasmuch as the link 29 is prevented from rearward movement during downward movement of the ramp from the position shown in FIGURE 3, such movement of the ramp will cause the link 29 to exert a force on the lip member 23, via the lever 30 and the lug 33, to swing the lip clockwise about the axis of the hinge 26. The force exerted by the link 29 on the lever 30 will rock the latter about the axis of the pivot 32, thereby causing the lever 30 to be thrust forwardly as the lip 23 is swung upwardly to its projected position. When the lip 23 has been swung to its fully raised position, as indicated in FIGURE 4, the lever 30 will have been drawn forwardly a distance sufficient to position the wall 41 forwardly of the pin 40. In this position of the lever, the thrust exerted on the lever 30 by the link 29 causes the lever to rock clockwise, thereby latching the lever against the pin 40.

Means is provided for automatically disengaging the link 29 from the actuating pin 38 and comprises an abutment or stop screw 43 which is adjustably threaded into a socket 44 that is supported between the guide plates 36 and 37. The screw 43 may be maintained in adjusted position by means of a lock nut 45. The abutment 43 is mounted in the vertical plane defined by the link 29 so as to be engageable by the latter upon downward swinging of the ramp from the position shown in FIGURE 3.

As the ramp swings from the position shown in FIGURE 3 to the position shown in FIGURE 4, the link 29 will engage the abutment 43 and displace the free end of the link upwardly so as to disengage the actuating pin 38 from the notch wall 35. Such disengagement, however, does not occur until after the latch lever 30 is positioned in latching engagement with the pin 40. Upon disengagement of the link 29 and its actuating means, the ramp 7 may be swung downwardly with the lip 25 latched in extended position so as to enable it to project forwardly of the dock and rest upon the load carrying bed of a truck or other vehicle (not shown).

Upon completion of the loading or unloading of the vehicle, it is preferred that the ramp be restored to its dock level position so as to permit cross traffic over the ramp. Restoration of the ramp to such position necessitates retraction of the lip member 25 so as to permit it to support the forward end of the ramp. In the disclosed embodiment, retraction of the lip member is effected by unlatching of the latch lever 30 and, in the disclosed embodiment, the latch lever may be released either by automatic or manual unlatching means.

Automatically operable unlatching means 42 comprises a post 46 that is secured to and depends from the latch lever 30. Pivoted to the post 46 is one end of a thrust link 46a, the other end of which is pivoted to an intermediate portion of an operating lever 47. One end of the lever 47 is pivoted to a depending lug 47a that is secured to the lower surface of the ramp 7, the other end of the lever having a roller 47b journalled thereon for engagement with the recess floor 6. When the lip 25 is in its retracted position, as is shown in FIGURES 2 and 3, the roller 47b is in a downwardly extended position, but it is incapable of engaging the recess floor 6 as long as the ramp is at or above its dock level position. When the lip is moved to its extended position as is shown in FIGURE 4, the forward movement of the latch lever 30 effects relative movement of the link 46a and the lever 47 in such manner as to swing the roller 47b toward the ramp 7, thereby making it possible for the latter to swing to a position lower than its dock level position without engagement between the floor 6 and the roller 47b.

To operate the automatic unlatching mechanism, the ramp member 7 may be swung downwardly below its dock level position at distance sufficient to enable the roller 47b to bear against the base 6 of the recess, as is shown in dotted lines in FIGURE 2 and in FIGURE 3. Engagement between the roller 47b and the recess floor will cause the latch lever 30 to be displaced vertically (see FIGURE 5), thereby effecting unlatching of the lever and the pin 40, whereupon the lip 25 will swing by gravity toward its retracted position. Upon release of the lip from its latched position, its downward swinging will cause rearward movement of the latch lever 30, and such movement will cause the roller 47b to exert a force against the floor 6. This force will exert a momentary lifting thrust on the ramp 7 of such magnitude as to swing the latter upwardly a distance sufficient to permit the lip 25 to be received behind the keepers 27, whereupon the ramp again will be supported in dock level position.

When the ramp is positioned in its dock level position and with the lip 25 in its retracted position, the post 46 lies adjacent the lugs 39 (see FIGURE 2) and would engage the latter if it were attempted to swing the lip counterclockwise from a vertical position. Thus, the members 39 and 46 cooperate with the keepers 27 to prevent any tendency of the lip to rock when it supports the ramp for cross traffic.

The manually operable unlatching mechanism is indicated by the reference character 48 and comprises an arm 49 which is located below and in the plane of the latch lever 30. The arm is fixed to a rock shaft 50 that is journaled in a suitable reinforcing member on the ramp member 7. An operating lever 51 also is fixed to the shaft 50 for rotating the latter. The ramp 7 is provided with an opening 52 in its upper surface to permit a workman to obtain access to the lever 51.

In its inactive position the arm 49 is located in a position to be free from engagement with the latching lever 30. However, upon rocking of the shaft 50 in a clockwise direction, as viewed in FIGURE 4, the arm 49 will bear against the lower surface of the lever 30 and lift the latter so as to effect disengagement of the lever from the latch pin 40. Upon unlatching of the lever 30, the lip 25 returns by gravity to its retracted position.

The front wall of the dock 3 preferably is provided with a pair of bumpers 53 that project several inches forwardly of the wall 5. As a result, a truck may be backed tightly against the bumpers without engaging the lip 25. If the truck should be left in this position, it will not interfere with operation of the ramp since the latter may be swung through a cycle to effect projection of the lip without interference from the truck. Moreover, the manually operable unlatching mechanism 48 permits retraction of the lip independently of the automatically operable means 42, thereby enabling retraction of the lip without necessitating movement of the truck away from the dock.

The disclosed embodiment is representative of a presently preferred form of the invention, but is intended to be illustrative rather than definitive thereof. The invention is defined in the claims.

The embodiments of the invention in which an exclusive property or privilege is claimed are defined as follows:

1. A loading ramp comprising support means; a ramp member rockably mounted at its rearward end on said support means for swinging movements between raised and lowered positions; a lip member; means hingedly mounting said lip member at the forward end of said ramp member for swinging movements between a first position substantially normal to said ramp member and a second position substantially in prolongation of said ramp member; rigid operating means pivotally connected to said lip member and being operable to swing said lip member from said first position toward said second position; and actuating means engageable with said operating means in response to swinging movement of said ramp member from a raised position toward a lowered position for actuating said operating means.

2. A construction as set forth in claim 1 including latch means reacting between said ramp member and said lip member when the latter is swung to its second position and operable to latch said lip member in said second position.

3. A construction as set forth in claim 2 including latch release means operable in response to swinging of said ramp member to its lowest position to release said latch means.

4. A construction as set forth in claim 3 wherein said latch release means includes means engageable with said support means and operable to exert a force on said ramp member to swing the latter toward said first position.

5. A loading ramp comprising support means; a ramp member rockably mounted at its rearward end on said support means for swinging movement between raised and lowered positions; a lip member hingedly mounted at the forward end of said ramp member for swinging movement between a depending position and a raised position in substantial prolongation of said ramp member; rigid operating linkage means movable with said ramp member and pivotally connected to said lip member and operable to swing the latter from said depending position toward said raised position; and actuating means supported by said support means for engagement with said linkage means in response to movement of said ramp member from a raised position toward a lowered position for effecting relative movement between said linkage means and said ramp member and swinging movement of said lip member to its raised position.

6. A construction as set forth in claim 5 including latch means reacting between said ramp member and said lip member when the latter is swung to its raised position and operable to latch said lip member in said raised position.

7. A construction as set forth in claim 6 including disengaging means engageable with said linkage means and operable to disengage the latter and said actuating means following latching of said lip member.

8. A construction as set forth in claim 6 including latch release means operable in response to swinging of said ramp member to its lowest position to release said latch means.

9. A construction as set forth in claim 6 including latch release means engageable with said latch means for releasing the latter; and manual means for operating said release means.

10. A loading ramp construction for a dock having a substantially horizontal surface, said construction comprising support means; a ramp member; rockable means mounting said ramp member at its rearward end for swinging movement between raised and lowered positions; a lip member hingedly connected to said ramp member at its forward end and depending therefrom, said lip member being swingable to a raised position in substantial prolongation of said ramp member, said lip member bearing on said support means and cooperating with said rockable means to support said ramp member in a substantially horizontal, dock level position when said ramp member is in its lowered position; rigid linkage means pivotally connected to said lip member; and abutment means on said support means cooperable with said link means in response to swinging movement of said ramp member from a raised position toward a lowered position to swing said lip member toward its said raised position.

11. The construction set forth in claim 10 including latch means reacting between said lip member and said ramp member for latching said lip member in its raised position.

12. The construction set forth in claim 11 including latch releasing means supported by said ramp member and engageable with said latch means to release the latter.

13. The construction set forth in claim 11 including latch releasing means interposed between said ramp member and said support means and engageable with said latch means to release the latter.

14. A loading ramp construction comprising support means; a ramp member rockably mounted at its rearward end on said support means for swinging movements between raised and lowered positions and biased by gravity toward its lowered position; a lip member hingedly connected to said ramp member at its forward end for swinging movements from a first position in substantial prolongation of said ramp member to a second position depending from said ramp member, said lip member being urged by gravity toward said second position; thrust means interposed between said ramp member and said support means; and means connecting said thrust means to said lip member for movement in response to swinging movement of the latter, said thrust means being operable to react between said support means and said ramp member in response to movement of said lip member toward said second position when said ramp member is in a lowered position to exert a force on said ramp member in opposition to the force of gravity and urge said ramp member toward a raised position.

15. A loading ramp construction comprising support means; a ramp member rockably mounted at its rearward end on said support means for swinging movement from a first, generally horizontal position to a raised position, and return; a lip member hingedly mounted at the forward end of said ramp member for swinging movements from a depending position to a second position in substantial prolongation of said ramp member; rigid operating linkage means pivoted to said lip member; and abutment means on said support means cooperable with said linkage means in response to swinging movement of said ramp member from said raised position toward said first position to swing said lip member toward said second position.

16. The construction set forth in claim 15 including latch means interconnecting said ramp member and said lip member and operable to latch the latter in said second position.

17. The construction set forth in claim 16 wherein said ramp member is swingable to a lowered position lower than said first position, and including latch release means reacting between said support means and said latch means for releasing the latter upon swinging movement of said ramp member to said lowered position.

18. The construction set forth in claim 16 including latch release means supported on said ramp member and engageable with said latch means to release the latter.

19. The construction set forth in claim 18 including manually operable means connected to said latch release means for operating the latter.

20. A loading ramp construction comprising support means; a ramp member rockably mounted at its rearward end on said support means for swinging movements between raised and lowered positions, said ramp member normally being urged by gravity to swing to its lowered position; a lip member hingedly connected to said ramp member at its forward end for swinging movements from a depending position to a second position in substantial prolongation of said ramp member, said lip member normally being urged by gravity to swing to said depending position; latch means reacting between said ramp member and said lip member for latching the latter in said second position; and latch releasing means connected to said lip member and interposed between said ramp member and said support means and acting between said latch means and said support means upon swinging movement of said ramp member to its lowest position to release said latch means and enable restoration of said lip member to its depending position by gravity, the restoration of said lip member to its depending position causing said latch releasing means to act on said support means to impart a thrust on said ramp member to swing the latter from its lowest position toward its raised position.

21. A loading ramp construction comprising support means; a ramp member pivotally connected at a first end thereof to said support means for pivotal movement on either side of a dock level position, a lip member pivotally connected to the second end of said ramp member, and operating linkage means for locking said lip member in an extended cantilevered position and for automatically unlocking said lip member and returning said ramp member to said dock level position.

22. A loading ramp construction as set forth in claim 21 wherein said operating linkage means includes latch lever means coacting with said lip member to move said lip member to said cantilevered position upon pivotal movement of said ramp member in a first direction.

23. A loading ramp construction as set forth in claim 22 wherein said latch lever means is disposed in a locked position in coaction with said ramp member when said lip member reaches said cantilevered position for maintaining said lip member in said cantilevered position.

24. A loading ramp construction as set forth in claim 23 including manual unlatching means for removing said latch lever means from said locked position so that said lip member pivots from said cantilevered position to a lowered pendent position.

25. A loading ramp construction as set forth in claim 23 wherein said operating linkage means includes unlocking means for removing said latch lever means from said locked position when said ramp member reaches a predetermined position below said dock level position so that said lip member pivots from said cantilevered position to a lowered pendent position.

26. A loading ramp construction as set forth in claim 25 wherein said operating linkage means includes thrust means for transmitting the force resulting from the weight of said lip member, when said lip member pivots from said cantilevered position to said lowered pendent position, to said ramp member to automatically pivot said ramp member to said dock level position.

27. A loading ramp construction as set forth in claim 26 wherein said force is transmitted through said latch lever means to said thrust means as said lip member pivots from said cantilevered position to said lowered pendent position.

28. A loading ramp construction as set forth in claim 27 wherein said ramp member includes lock means engaging said latch lever means, and said latch lever means includes a cut-away portion for receiving said lock means when said lip member reaches said cantilevered position to maintain said lip member in said cantilevered position.

29. A loading ramp construction comprising: support means; a ramp member pivotally connected at a first end thereof to said support means for swinging movements between raised and lowered positions, a lip member pivotally connected to the second end of said ramp member, and operating linkage means for locking said lip member in an extended cantilevered position and for unlocking said lip member when said ramp member is moved to a predetermined position to transmit a thrust caused by the weight of said lip member to said ramp member to pivot said ramp member.

30. A loading ramp construction of the type allowing free movement of traffic between a vehicle and a loading dock, said ramp construction comprising: support means; a ramp member pivotally connected at a first end thereof to said support means for pivotal movement on either side of a dock level position; a lip member pivotally connected to the second end of said ramp member for movement between an extended cantilevered position and a lowered position; and operating linkage means operatively interconnecting said support structure, said ramp member, and said lip member for automatically pivoting said ramp member and said lip member through a predetermined sequence of movements when the vehicle is moved away from the loading ramp to pivot said lip member to said lowered position and to pivot said ramp member to said dock level position.

31. A loading ramp construction comprising: support means; a ramp member pivotally connected at a first end thereof to said support means for pivotal movement on either side of a dock level position, a lip member pivotally connected to the second end of said ramp member, and operating linkage means operatively interconnecting said lip member and said ramp member for selectively transmitting the force created by the weight of said lip member to said ramp member to pivot said ramp member from a predetermined position below said dock level position toward said dock level position.

32. A loading ramp construction comprising: support means; a ramp member pivotally connected at a first end thereof to said support means for pivotal movement on either side of a dock level position; a lip member pivotally connected to the second end of said ramp member for movement relative to said ramp member between an extended cantilevered position and a pendent position; and means responsive to the weight of said lip member in moving from said cantilevered position toward said pendent position to urge said ramp member to said dock level position.

33. A loading ramp construction comprising: support means; a ramp member pivotally connected to said support means for movement on either side of a dock level position; a lip member pivotally connected to said ramp member for movement relative to said ramp member between an extended cantilevered position and a pendent position; and means responsive to the weight of said lip member as said lip member pivots from said cantilevered position to said pendent position to coact with said support means and said ramp member to pivot said ramp member to said dock level position.

34. A loading ramp construction comprising: support means, a ramp pivotally connected to said support means for pivotal movement relative thereto, a lip pivotally connected to said ramp for movement relative thereto to and from an extended cantilevered position, and operating linkage means operatively interconnecting said lip and said ramp for locking said lip in said extended cantilevered position and for automatically unlocking said lip in a first predetermined position of said ramp and pivoting said ramp toward a second predetermined position as said lip pivots from said extended cantilevered position thereof.

35. A loading ramp as set forth in claim 34 wherein said operating linkage means includes means for transmitting the force, resulting from the weight of said lip during movement of said lip from said cantilevered position thereof, to said ramp to pivot said ramp upward toward said second predetermined position thereof.

References Cited

UNITED STATES PATENTS

| | | | |
|---|---|---|---|
| 2,974,336 | 3/1961 | Kelley | 14—71 |
| 3,117,332 | 1/1964 | Kelley | 14—71 |
| 3,167,796 | 2/1965 | Layne | 14—71 |

CHARLES E. O'CONNELL, *Primary Examiner.*

N. C. BYERS, *Assistant Examiner.*